US012683066B2

(12) United States Patent
Kim et al.

(10) Patent No.: US 12,683,066 B2
(45) Date of Patent: Jul. 14, 2026

(54) COIL COMPONENT

(71) Applicant: SAMSUNG ELECTRO-MECHANICS CO., LTD., Suwon-si (KR)

(72) Inventors: Yong Min Kim, Suwon-si (KR); Jae Hun Kim, Suwon-si (KR); Chang Yun Lee, Suwon-si (KR); Dae Chul Choi, Suwon-si (KR); Se Yeon Hwang, Suwon-si (KR); Yeo Ok Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 794 days.

(21) Appl. No.: 18/076,715

(22) Filed: Dec. 7, 2022

(65) Prior Publication Data

US 2023/0207185 A1 Jun. 29, 2023

(30) Foreign Application Priority Data

Dec. 28, 2021 (KR) ........................ 10-2021-0189220
Oct. 20, 2022 (KR) ........................ 10-2022-0135930

(51) Int. Cl.

*H01F 5/00* (2006.01)
*H01F 17/04* (2006.01)
*H01F 27/28* (2006.01)
*H01F 27/29* (2006.01)

(52) U.S. Cl.

CPC ......... *H01F 27/292* (2013.01); *H01F 17/045* (2013.01); *H01F 27/2804* (2013.01); *H01F 27/2828* (2013.01)

(58) Field of Classification Search

CPC .................................................. H01F 27/2804
USPC ......................................................... 336/200
See application file for complete search history.

(56) References Cited

U.S. PATENT DOCUMENTS

2015/0102891 A1 4/2015 Yoon et al.
2017/0125166 A1 5/2017 Muneuchi et al.
2018/0130596 A1 5/2018 Yamaguchi
2020/0194167 A1 * 6/2020 Lee ....................... H01F 27/292

FOREIGN PATENT DOCUMENTS

KR 10-1642578 B1 8/2016
KR 10-1854578 B1 5/2018

OTHER PUBLICATIONS

English translation of KR102191248 (Year: 2020).*

* cited by examiner

*Primary Examiner* — Ronald Hinson
(74) *Attorney, Agent, or Firm* — Morgan, Lewis & Bockius LLP

(57) ABSTRACT

A coil component includes a body having a first surface, a coil including a coil pattern having a plurality of turns, a first and second lead-out portions disposed in the body and connected to one end and the other end of the coil, respectively, a first and second dummy lead-out portions disposed in the body and spaced apart from the coil, a first and second external electrodes disposed on the first surface of the body and connected to the first and second lead-out portions, respectively. A coil pattern closest to the first surface among the coil patterns disposed in a region between the first lead-out portion and the first dummy lead-out portion is connected to the first lead-out portion.

41 Claims, 11 Drawing Sheets

COIL COMPONENT

CROSS-REFERENCE TO RELATED APPLICATION(S)

This application claims benefit of priority to Korean Patent Application No. 10-2021-0189220 filed on Dec. 28, 2021 and Korean Patent Application No. 10-2022-0135930 filed on Oct. 20, 2022 in the Korean Intellectual Property Office, the disclosures of which are incorporated herein by reference in their entirety.

TECHNICAL FIELD

The present disclosure relates to a coil component.

BACKGROUND

An inductor, a coil component, is a typical passive electronic component used in electronic devices along with a resistor and a capacitor.

As electronic devices are gradually improved in performance and miniaturized, the number of miniaturized electronic components used in electronic devices is increasing.

In the case of a thin-film coil component, a coil is formed on a support member by plating, and a magnetic composite sheet in which a magnetic metal powder is dispersed in an insulating resin is laminated and cured to form a body, and then external electrodes are formed on the surface of the body. In this case, as the coil components are miniaturized and thinned, a problem in which coupling force between the coil and the external electrode is weakened may occur.

SUMMARY

An aspect of the present disclosure is to enhance connection reliability by strengthening coupling force between a coil and an external electrode through stress distribution.

An aspect of the present disclosure is to improve inductance characteristics of a coil component by increasing the number of turns of the coil.

According to an aspect of the present disclosure, a coil component includes a body having a first surface and a second surface opposing each other in a first direction; a coil disposed in the body and including a coil pattern having a plurality of turns; a first lead-out portion disposed in the body and connected to one end of the coil; a second lead-out portion disposed in the body and connected to the other end of the coil; a first dummy lead-out portion and a second dummy lead-out portion disposed in the body and spaced apart from the coil; a first external electrode disposed on the first surface of the body and connected to the first lead-out portion; and a second external electrode disposed on the first surface of the body and connected to the second lead-out portion. A coil pattern closest to the first surface among the coil pattern disposed in a region between the first lead-out portion and the first dummy lead-out portion is connected to the first lead-out portion, and a coil pattern closest to the first surface among the coil pattern disposed in a region between the second lead-out portion and the second dummy lead-out portion is connected to the second lead-out portion.

According to an aspect of the present disclosure, a coil component includes a body having a first surface and a second surface opposing each other; a support member disposed in the body, perpendicular to the first surface of the body; a coil disposed on the support member and including a coil pattern having a plurality of turns; first and second lead-out portions disposed in the body and respectively connected to one end and the other end of the coil; and first and second external electrodes disposed on the first surface of the body and connected to the first and second lead-out portions, respectively. The first and second lead-out portions are respectively connected to an outermost turn of the coil and spaced apart from an inner turn closest to the outermost turn, and in a region adjacent to the first surface of the body, an outermost turn of the coil connected to the first lead-out portion and an outermost turn of the coil connected to the second lead-out portion partially overlap each other around the support member when viewed in a direction of a central axis of the coil.

According to an aspect of the present disclosure, a coil component includes a body including a first surface and a second surface opposing each other in a first direction, a third surface and a fourth surface opposing each other in a second direction, and a fifth surface and a sixth surface opposing each other in a third direction; a support member disposed in the body; a coil including a first coil pattern having a plurality of first turns disposed on one surface of the support member, the plurality of first turns being wound around an axis crossing the fifth surface and the six surface; a first lead-out portion disposed in the body and connected to the first coil pattern only through a first connection pattern extending from the first lead-out portion; and a first external electrode disposed on the first surface of the body and connected to the first lead-out portion. The first connection pattern is disposed between the first surface of the body and a core of the coil, and extends across a center portion of the body located in the second direction.

to an aspect of the present disclosure, a coil component includes a body including a first surface and a second surface opposing each other in a first direction, a third surface and a fourth surface opposing each other in a second direction, and a fifth surface and a sixth surface opposing each other in a third direction; a coil disposed in the body and including a first coil pattern having a plurality of first turns wound outwards in a first rotating order in a sequence corresponding to an order of the fourth, second, third, and first surfaces; a first lead-out portion extending from the first surface towards an interior of the body and connected to the first coil pattern only through a first connection pattern extending according to the first rotating order towards the first lead-out portion; and a first external electrode disposed on the first surface of the body and connected to the first lead-out portion. The first external electrode is closer to the fourth surface than the third surface.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
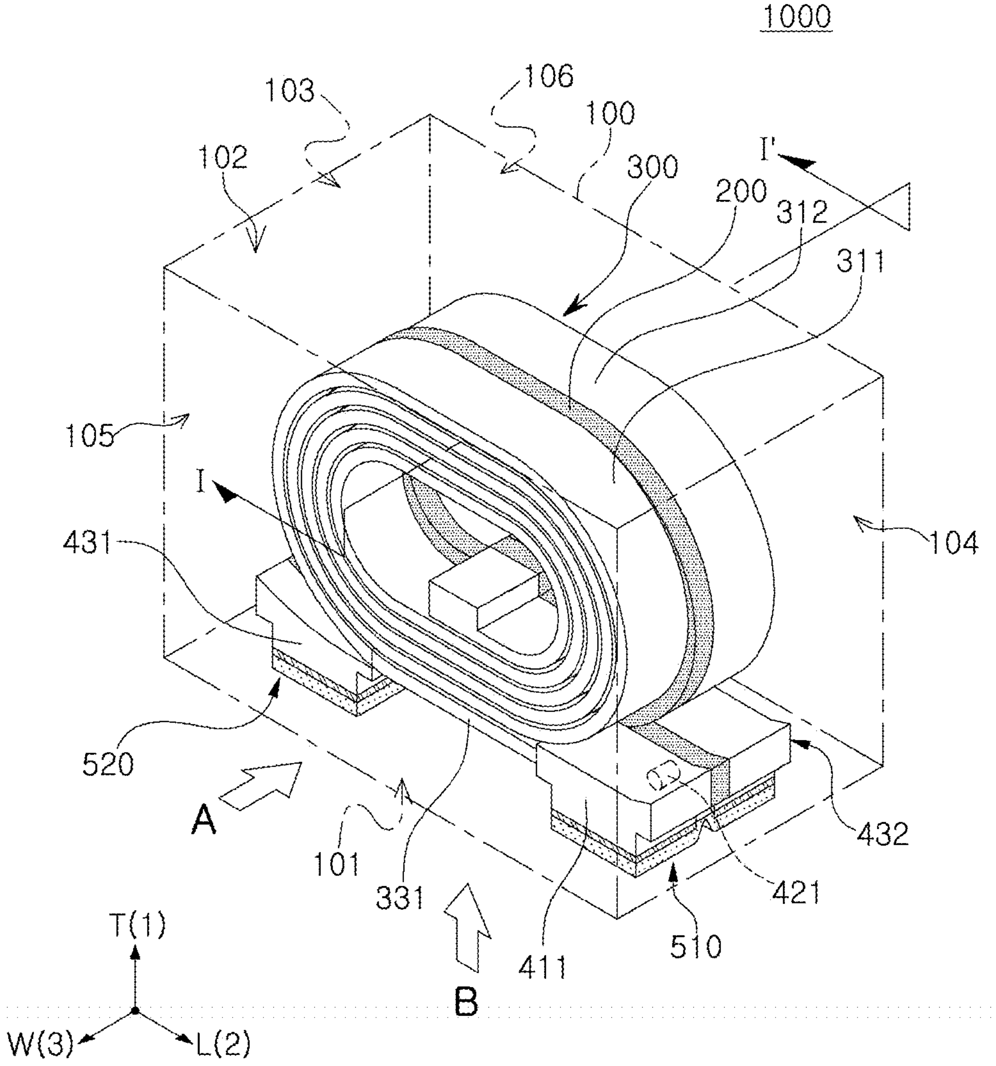
FIG. 1 is a perspective view schematically illustrating a coil component according to a first exemplary embodiment.

The terms used in the present application are only used to describe specific embodiments, and are not intended to limit the present disclosure. The singular expression includes the plural expression unless the context clearly dictates otherwise. In the present application, terms such as "comprise" or "have" are intended to designate that a feature, number, step, operation, component, part, or combination thereof described in the specification exists, and it should be understood that this does not preclude the possibility of addition or existence of one or more other features or numbers, steps, operations, components, parts, or combinations thereof. Throughout the specification, "on" means to be positioned above or below the target part, and does not necessarily mean to be positioned on the upper side with respect to the direction of gravity.

In addition, the term "coupling" does not mean only a case of direct physical contact between respective components in the contact relationship between respective components, and is used as a concept that encompasses even the case in which other components are interposed between respective components and the components are respectively in contact with the other components.

The size and thickness of each component illustrated in the drawings are arbitrarily indicated for convenience of description, and the present disclosure is not necessarily limited to the illustration.

In the drawings, a T direction may be defined as a first direction or a thickness direction, an L direction may be defined as a second direction or a longitudinal direction, and a W direction may be defined as a third direction or a width direction.

Hereinafter, a coil component according to an embodiment will be described in detail with reference to the accompanying drawings, and in the description with reference to the accompanying drawings, the same or corresponding components are given the same reference numerals, and the overlapping description thereof will be omitted.

Various types of electronic components are used in electronic devices, and among these electronic components, various types of coil components may be appropriately used for noise removal and the like.

For example, in electronic devices, the coil component may be used as a power inductor, a high frequency (HF) inductor, a general bead, a high frequency bead (GHz Bead), a common mode filter, or the like.

First Exemplary Embodiment

Figure 2:
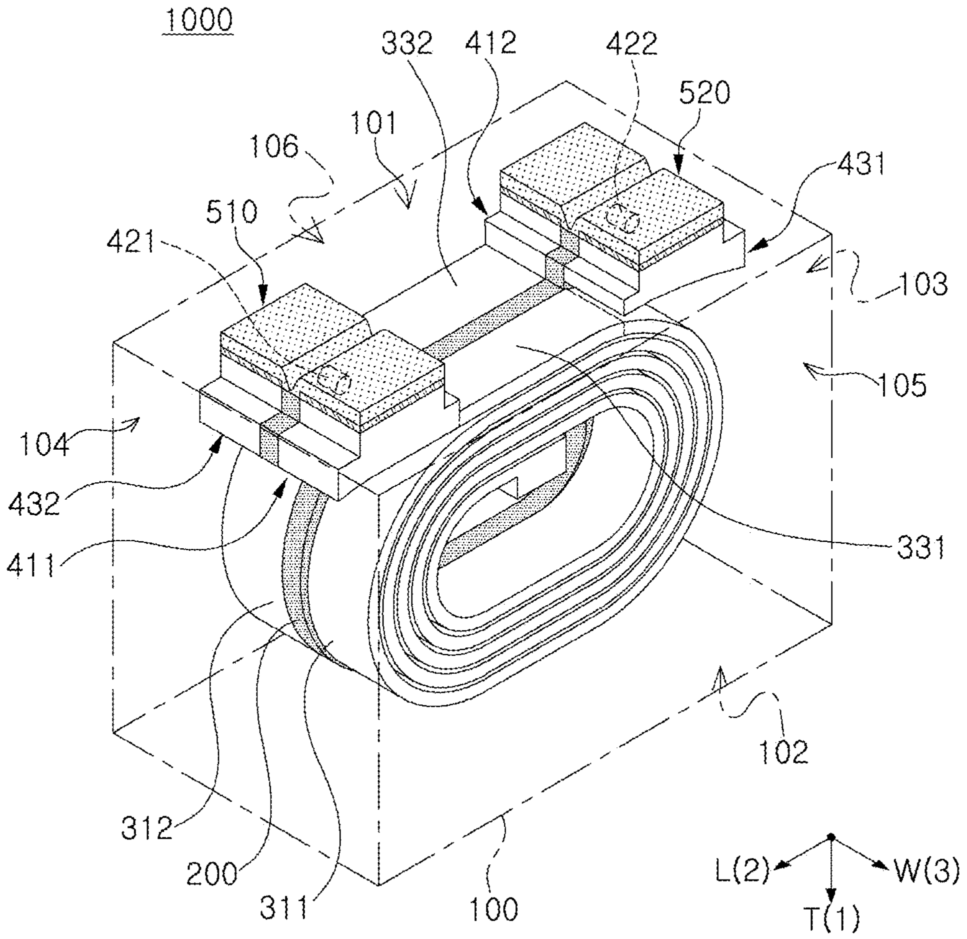
FIG. 2 is a lower perspective view of FIG. 1.
Figure 3:
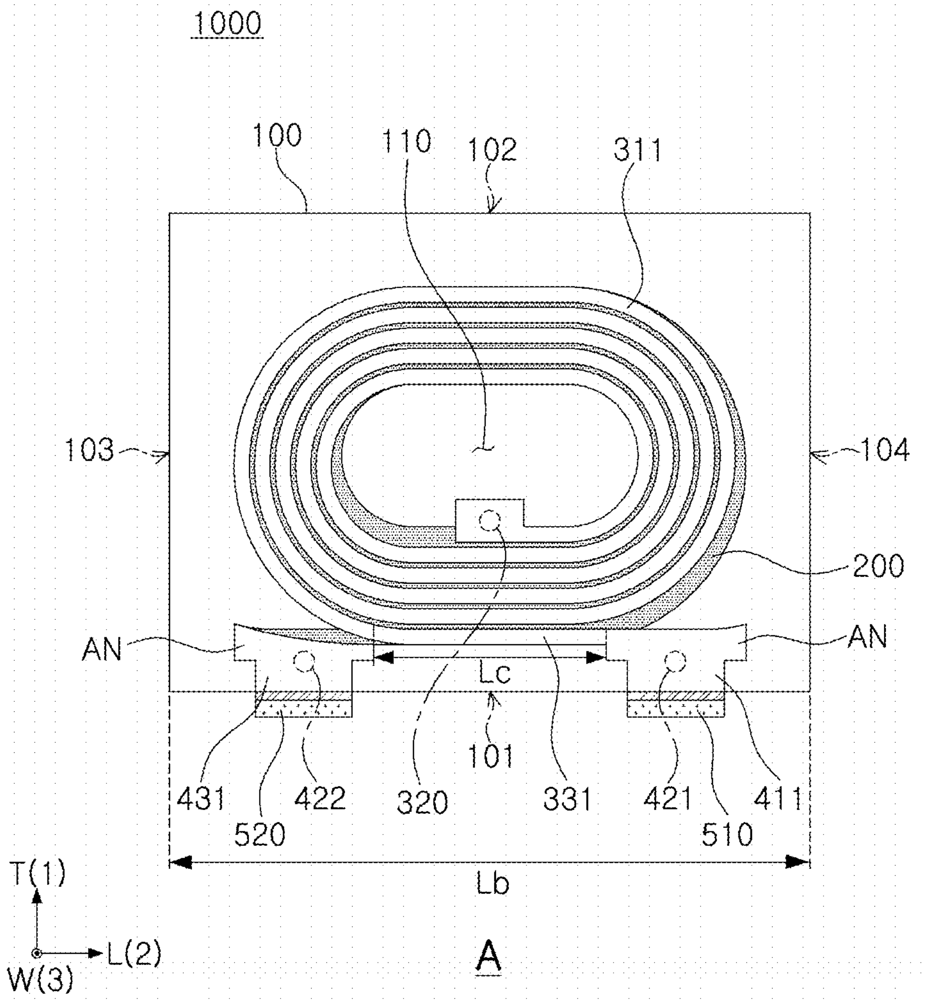
FIG. 3 is a front view taken in direction A of FIG. 1.
Figure 4:
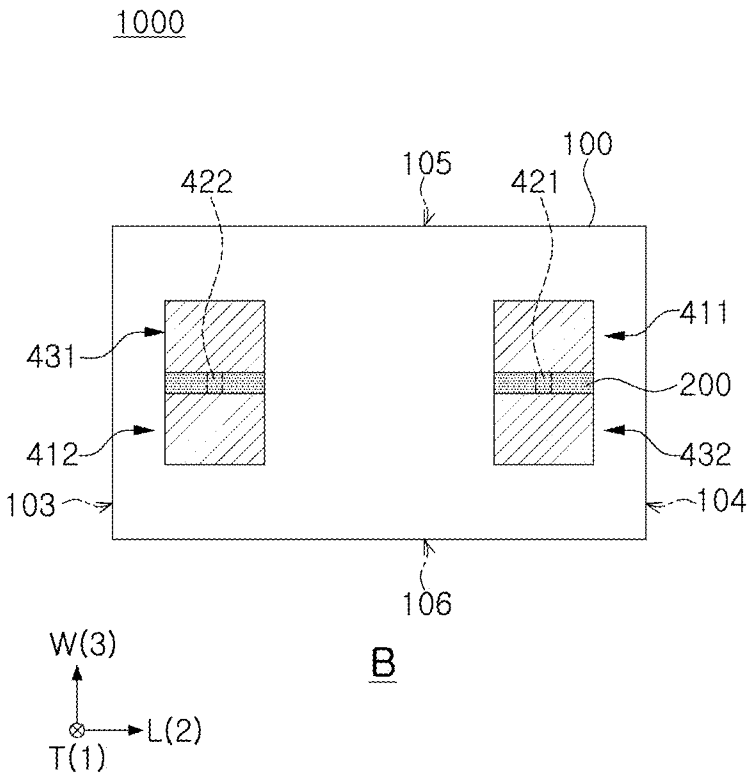
FIG. 4 is a bottom view taken in direction B of FIG. 1.
Figure 5:
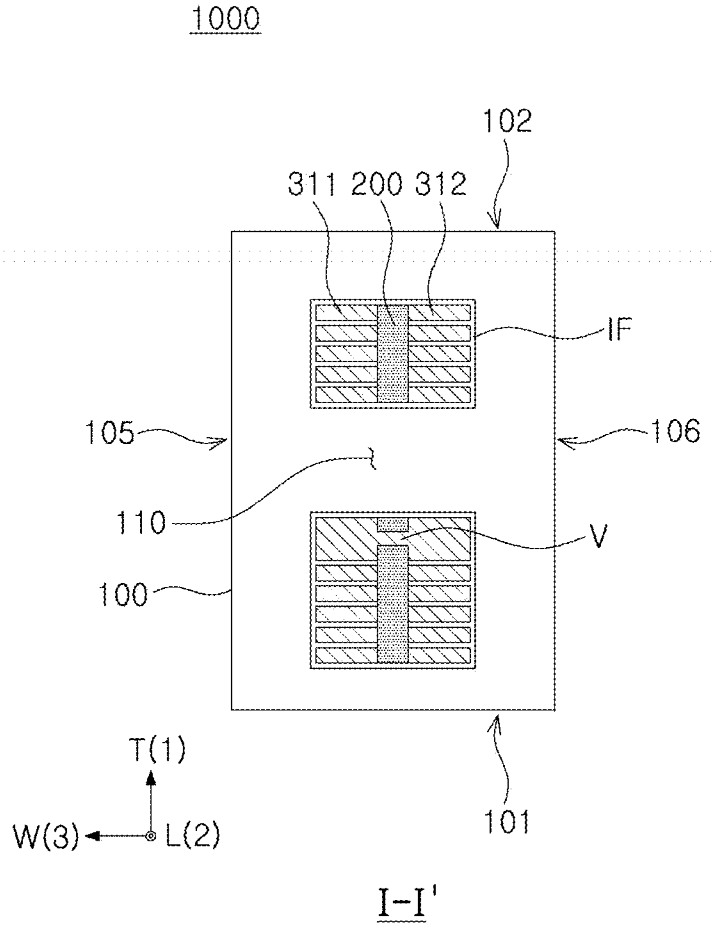
FIG. 5 is a view illustrating a cross-section taken along line I-I' of FIG. 1.

FIG. 1 is a perspective view schematically illustrating a coil component 1000 according to a first exemplary embodiment. FIG. 2 is a lower perspective view of FIG. 1. FIG. 3 is a front view taken in direction A of FIG. 1. FIG. 4 is a bottom view taken in direction B of FIG. 1. FIG. 5 is a view illustrating a cross-section taken along line I-I' of FIG. 1.

On the other hand, to more clearly illustrate the coupling between the components, the insulating layer on the body 100, which may be applied to the embodiment, is omitted and illustrated.

Referring to FIGS. 1 to 5, the coil component 1000 according to the present embodiment may include a body 100, a coil 300, lead-out portions 411 and 412, dummy lead-out portions 431 and 432, and external electrodes 510 and 520, and may further include a support member 200.

In the case of the coil component 1000 according to this embodiment, the surface mounted on the PCB substrate and the central axis of the coil 300 are disposed side by side, and both ends of the coil 300 may extend in the longitudinal direction L, respectively, and may be connected to the far-side lead-out portions 411 and 412 rather than the adjacent dummy lead-out portions 431 and 432. For example, both ends of the outermost turn of the coil 300 are disposed to cross each other in a region relatively close to the mounting surface, and therefore, structurally, the coupling force between the coil 300 and the lead-out portions 411 and 412 or the coil 300 and the external electrodes 510 and 520 may be strengthened. Hereinafter, the coil component 1000 according to the present embodiment will be described in detail for respective components.

The body 100 may form the exterior of the coil component 1000 according to the present embodiment, and the coil 300 and the support member 200 may be embedded therein.

The body 100 may be formed in the shape of a hexahedron as a whole.

The body 100 may include a first surface 101 and a second surface 102 opposing each other in a thickness direction (T), a third surface 103 and a fourth surface 104 opposing each other in a longitudinal direction (L), and a fifth surface 105 and a sixth surface 106 opposing each other in a width direction (W).

The body 100 is formed such that, for example, the coil component 1000 according to the present embodiment in which external electrodes 510 and 520 to be described later are formed has a length of 0.8 mm, a width of 0.4 mm, and a thickness of 0.8 mm, a length of 0.8 mm, a width of 0.4 mm and a thickness of 0.65 mm, a length of 1.0 mm, a width of 0.7 mm and a thickness of 0.8 mm, a length of 1.0 mm, a width of 0.6 mm and a thickness of 0.8 mm, a length of 1.0 mm, a width of 0.5 mm and a thickness of 0.8 mm, a length of 1.0 mm, a width of 0.5 mm and a thickness of 0.65 mm, or a length of 1.0 mm, a width of 0.5 mm and a thickness of 0.6 mm, but the present disclosure is not limited thereto.

Based on the optical microscope image or Scanning Electron Microscope (SEM) image of a longitudinal direction (L)-thickness direction (T) cross-section taken from a width direction (W) central portion of the coil component 1000, the length of the coil component 1000 described above may refer to a maximum value of dimensions of a plurality of line segments obtained by connecting two outermost boundary lines of the coil component 1000, which face in the longitudinal direction (L) illustrated in the image, to each other to be parallel to the longitudinal direction (L) and which are spaced apart from each other in the thickness direction. Alternatively, the length of the coil component 1000 may refer to a minimum value among the dimensions of the plurality of respective line segments described above. Alternatively, the length of the coil component 1000 may refer to an arithmetic mean value of at least three or more of the dimensions of the plurality of respective line segments described above. In this case, the plurality of line segments parallel to the longitudinal direction L may be equally spaced from each other in the thickness direction T, but the scope of the present disclosure is not limited thereto.

Based on the optical microscope image or Scanning Electron Microscope (SEM) image of the longitudinal direction (L)-thickness direction (T) cross-section taken from the central portion of the coil component 1000 in the width direction (W), the thickness of the coil component 1000 described above may refer to a maximum value of dimensions of a plurality of respective line segments obtained by connecting two outermost boundary lines of the coil component 1000, which face in the thickness direction (T) illustrated in the image, to each other to be in parallel to the thickness direction (T) and which are spaced apart from each other in the longitudinal direction (L). Alternatively, the thickness of the coil component 1000 may refer to a minimum value among the dimensions of the plurality of respective line segments described above. Alternatively, the thickness of the coil component 1000 may refer to an arithmetic mean value of at least three or more of the dimensions of the plurality of respective line segments described above. In this case, the plurality of line segments parallel to the thickness direction T may be equally spaced from each other in the longitudinal direction L, but the scope of the present disclosure is not limited thereto.

Based on the optical microscope image or Scanning Electron Microscope (SEM) image of the longitudinal direction (L)-width direction (W) cross-section taken from a central portion of the coil component 1000 in the thickness direction (T), the width of the coil component 1000 described above may refer to a maximum value among dimensions of a plurality of respective line segments, which are provided by connecting two outermost boundary lines of the coil component 1000 facing in the width direction (W), illustrated in the image, to be parallel to the width direction (W), and which are spaced apart from each other in the longitudinal direction (L). Alternatively, the width of the coil component 1000 may refer to a minimum value among the dimensions of the plurality of respective line segments described above. Alternatively, the width of the coil component 1000 may refer to an arithmetic mean value of at least three or more of the dimensions of the plurality of respective line segments described above. In this case, the plurality of line segments parallel to the width direction W may be equally spaced from each other in the longitudinal direction L, but the scope of the present disclosure is not limited thereto.

Alternatively, each of the length, width, and thickness of the coil component 1000 may be measured by a micrometer measurement method. The micrometer measurement method may be performed by setting the zero point with a gage Repeatability and Reproducibility (R&R) micrometer, inserting the coil component 1000 according to this embodiment between the tips of the micrometer and turning the measuring lever of the micrometer. On the other hand, in measuring the length of the coil component 1000 by the micrometer measurement method, the length of the coil component 1000 may refer to a value measured once, and may also refer to an arithmetic mean of values measured multiple times. This may equally be applied to the width and thickness of the coil component 1000.

In the case of the coil component 1000 according to the present embodiment, based on the direction of FIG. 1, the maximum length of the coil component 1000 in the second direction L, in which the external electrodes 510 and 520 to be described later are formed, may be 1.1 mm or less, the maximum width in the third direction (W) may be 0.66 mm or less, and the maximum thickness in the first direction T may be 0.88 mm or less, but the present disclosure is not limited thereto.

On the other hand, since the above-mentioned numerical value is only a numerical value on the design that does not reflect process errors or the like, it should be considered that the range that may be recognized as a process error falls within the scope of the present disclosure.

The body 100 may include a magnetic material and a resin. In detail, the body 100 may be formed by laminating one or more magnetic composite sheets in which a magnetic material is dispersed in a resin. However, the body 100 may have a structure other than a structure in which a magnetic material is dispersed in a resin. For example, the body 100 may be formed of a magnetic material such as ferrite, or may be formed of a non-magnetic material.

The magnetic material may be ferrite or metallic magnetic powder.

Ferrite may be at least one of, for example, spinel-type ferrites such as Mg—Zn, Mn—Zn, Mn—Mg, Cu—Zn, Mg—Mn—Sr, Ni—Zn, and the like, hexagonal ferrites such as Ba—Zn, Ba—Mg, Ba—Ni, Ba—Co, and Ba—Ni—Co, and the like, garnet-type ferrites such as Y and the like, and Li ferrites.

The magnetic metal powder may be any one or more selected from the group consisting of iron (Fe), silicon (Si), chromium (Cr), cobalt (Co), molybdenum (Mo), aluminum (Al), niobium (Nb), copper (Cu) and nickel (Ni). For example, the magnetic metal powder may be at least one of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder.

The magnetic metal powder may be amorphous or crystalline. For example, the magnetic metal powder may be an Fe—Si—B—Cr-based amorphous alloy powder, but is not necessarily limited thereto.

Each of the ferrite and the magnetic metal powder may have an average diameter of about 0.1 μm to 30 μm, but the present disclosure is not limited thereto.

The body 100 may include two or more types of magnetic materials dispersed in a resin. In this case, the different types of magnetic materials mean that the magnetic materials dispersed in the resin are distinguished from each other by any one of an average diameter, composition, crystallinity, and shape.

The resin may include, but is not limited to, epoxy, polyimide, a liquid crystal polymer, or the like, alone or in combination.

The body 100 may include the support member 200 and/or the core 110 penetrating the coil 300. The core 110 may be formed by filling the central region of the coil 300 and the through-hole of the support member 200 with the magnetic composite sheet, but is not limited thereto.

The support member 200 is disposed in the body 100. The support member 200 is configured to support the coil 300, the lead-out portions 411 and 412, and the dummy lead-out portions 431 and 432.

The support member 200 may be formed of an insulating material including a thermosetting insulating resin such as an epoxy resin, a thermoplastic insulating resin such as polyimide, or a photosensitive insulating resin, or may be formed of an insulating material impregnated with a reinforcing material such as glass fiber or an inorganic filler in this insulating resin. For example, the support member 200 may include a prepreg, Ajinomoto Build-up Film (ABF), FR-4, Bismaleimide Triazine (BT) resin, Photo Imageable Dielectric (PID), and Copper Clad Laminate (CCL), but the present disclosure is not limited thereto.

As an inorganic filler, at least one selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), carbonic acid or calcium ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support member 200 is formed of an insulating material including a reinforcing material, the support member 200 may provide more excellent rigidity. When the support member 200 is formed of an insulating material that does not contain glass fibers, and it may be advantageous to reduce the width of the component by reducing the thickness of the support member 200 and the coil 300 as a whole. When the support member 200 is formed of an insulating material including a photosensitive insulating resin, since the number of processes for forming the coil 300 is reduced, it may be advantageous to reduce production costs, and a fine via 320 may be formed.

The coil 300 is disposed in the body 100 and may include coil patterns 311 and 312 formed of a plurality of turns. In this embodiment, the coil 300 may be disposed on the support member 200. The coil 300 is embedded in the body 100 to express the characteristics of the coil component. For example, when the coil component 1000 of this embodiment is used as a power inductor, the coil 300 may serve to stabilize the power of the electronic device by storing the electric field as a magnetic field to maintain the output voltage.

In the coil component 1000 according to the present embodiment, the central axis of the coil 300 may be disposed parallel to the first surface 101 of the body 100. In addition, the support member 200 for supporting the coil 300 may be disposed perpendicularly to the first surface 101 of the body 100.

Through the structure in which the coil 300 and the support member 200 are vertically disposed on the first surface 101 of the body 100 as the mounting surface as described above, the mounting area may be reduced while maintaining the volume of the body 100 and the coil 300.

In addition, since the direction of the magnetic flux induced to the core 110 by the coil 300 is parallel to the first surface 101 of the body 100, when mounted on a PCB substrate, noise components induced from the PCB substrate may be relatively reduced.

On the other hand, in this specification, the meaning that the support member 200 is vertically disposed on the first surface 101 of the body 100 indicates that when the surface of the coil 300 in contact with the support member 200 is virtually extended, the angle formed with the first surface 101 of the body 100 is vertical or close to vertical, as illustrated in FIG. 1. For example, the support member 200 may form an angle of 80° to 100° with the first surface 101 of the body 100.

Referring to FIGS. 1 to 3, one end of the coil 300 is connected to the first lead-out portion 411, and the other end of the coil 300 may be connected to the second lead-out portion 412.

In detail, the coil 300 may include first and second coil patterns 311 and 312 respectively disposed on one surface and the other surface of the support member 200, and vias 320 connecting the first and second coil patterns 311 and 312.

The first coil pattern 311 and the second coil pattern 312 are disposed on both sides of the support member 200 opposing each other, respectively, and may have a planar spiral in which at least one turn is formed around the core 110 of the body 100 as a central axis.

For example, based on the direction of FIG. 1, the first coil pattern 311 may be disposed on one surface (front surface) of the support member 200 to form at least one turn with the core 110 as a central axis. The first coil pattern 311 may be wound outwards in a first rotating order in a sequence corresponding to an order of the fourth surface 104, the second surface 102, the third surface 103, and the first surface 101. The second coil pattern 312 may be disposed on the other surface (rear surface) of the support member 200 to form at least one turn with the core 110 as an axis. The second coil pattern 312 may be wound outwards in a second rotating order in a sequence corresponding to an order of the fourth surface 104, the first surface 101, the third surface 103, and the second surface 102.

Referring to FIGS. 3 and 5, the coil component 1000 according to the present embodiment may include a via 320 connecting the first coil pattern 311 and the second coil pattern 312 to each other. In detail, in this embodiment, the via 320 may pass through the support member 200 to connect the innermost ends of the respective first and second coil patterns 311 and 312.

Through the above structure, the first and second coil patterns 311 and 312 may function as one coil, as a whole, between the external electrodes 510 and 520. In detail, the signal input to the first external electrode 510 may be output to the second external electrode 520 through a first lead-out portion 411, a first connection pattern 331, a first coil pattern 311, a via 320, a second coil pattern 312, a second connection pattern 332, and a second lead-out portion 412.

Both ends of the coil 300, for example, the ends of the outermost turns of the respective first and second coil patterns 311 and 312 are disposed closer to the first surface 101 of the body 100 than to the central portion of the body 100 in the thickness direction T. Through the above structure, the total number of turns of the coil 300 in the body 100 of the same size may be increased as compared to the case in which both ends of the coil 300 are formed only in the center portion of the body 100 in the thickness direction T.

Referring to FIGS. 1 to 3, among the coil patterns disposed in the region between the first lead-out portion 411 and the first dummy lead-out portion 431, the coil pattern closest to the first surface 101 of the body 100 may be connected to the first lead-out portion 411 (or extend from the first lead-out portion 411), and among the coil patterns disposed in the region between the second lead-out portion 412 and the second dummy lead-out portion 432, the coil pattern closest to the first surface 101 of the body 100 may be connected to the second lead-out portion 412 (or extend from the second lead-out portion 412).

For example, the outermost turn that is the coil pattern closest to the first surface 101 of the body 100 among turns of the coil pattern disposed in the region between the first lead-out portion 411 and the first dummy lead-out portion 431 may be spaced apart from the first dummy lead-out portion 431, and may be connected to the first lead-out portion 411. Similarly, among the turns of the coil pattern disposed in the region between the second lead-out portion 412 and the second dummy lead-out portion 432, the outermost turn that is the coil pattern closest to the first surface

101 of the body 100 may be spaced apart from the second dummy lead-out portion 432 and may be connected to the second lead-out portion 412.

In this specification, for convenience of description, the first and second connection patterns 331 and 332 are defined. The first and second connection patterns 331 and 332 may refer to a partial region of the coil 300, in detail, a partial region of an outermost turn of the coil 300. In the drawings, for convenience of description, the boundary lines for the regions of the first and second connection patterns 331 and 332 are illustrated as dotted lines, but may be integrally formed without a boundary line in one process, and the present disclosure is not limited thereto.

Referring to FIGS. 1 to 3, the connection patterns 331 and 332 may indicate a portion corresponding to the region between the lead-out portions 411 and 412 and the dummy lead-out portions 431 and 432 among the outermost turns of the coil 300.

For example, one end of the first connection pattern 331 may indicate a point at which a virtual line extending from the second direction (L) innermost boundary line of the first dummy lead-out portion 431 in the first direction T and the outermost turn of the first coil pattern 311 meet. In addition, the other end of the first connection pattern 331 may refer to a point at which the outermost turn of the first coil pattern 311 contacts the first lead-out portion 411.

Similarly, one end of the second connection pattern 332 may refer to a point at which a virtual line extending from the second direction (L) innermost boundary line of the second dummy lead-out portion 432 in the first direction (T) and the outermost turn of the second coil pattern 312 meet. Also, the other end of the second connection pattern 332 may refer to a point at which the outermost turn of the second coil pattern 312 contacts the second lead-out portion 412.

In a case in which the outermost turns of the coil patterns 311 and 312 are directly connected to the lead-out portion on the near side (the position of the dummy lead-out portion in this embodiment), a portion in which the end of the coil 300 is bent occurs to create a weak region in which the stress is greatly applied, but in the present embodiment, by connecting the ends of the outermost turns of the coil patterns 311 and 312 to the lead-out portions 411 and 412 on the far side through the connection patterns 331 and 332, stress may be reduced. As a result, defects such as drop-off of the lead-out portions 411 and 412 or disconnection of the connection with the coil patterns 311 and 312 due to stress during PCB mounting may be reduced.

Referring to FIGS. 1 to 3, one end of the first connection pattern 331 may be disposed closer to the third surface 103 among the third surface 103 and the fourth surface 104 of the body 100 to be connected to the first coil pattern 311, and the other end of the first connection pattern 331 may be disposed closer to the fourth surface 104 among the third surface 103 and the fourth surface 104 to be connected to the first lead-out portion 411. In addition, one end of the second connection pattern 332 may be disposed closer to the fourth surface 104 among the third surface 103 and the fourth surface 104 of the body 100 to be connected to the second coil pattern 312, and the other end of the second connection pattern 332 may be disposed closer to the third surface 103 among the third surface 103 and the fourth surface 104 to be connected to the second lead-out portion 412.

On the other hand, since the coil 300 disposed on both sides of the support member 200 may be formed in a shape corresponding to each other, with reference to FIGS. 1 and 3 below, the components viewed in the A direction will be described as a reference.

Referring to FIG. 3, the first connection pattern 331 may extend from the outermost turn of the first coil pattern 311 in a direction in which the first coil pattern 311 is wound from the inside to the outside and may be connected to the first lead-out portion 411.

On the L-T cross-section perpendicular to the central axis of the coil 300 as illustrated in FIG. 3, the first connection pattern 331 may have a straight shape. For example, the first connection pattern 331 may have a straight shape extending from the end of the outermost turn of the first coil pattern 311 to the first lead-out portion 411. In this case, the meaning of a straight shape is not limited to a form having a curvature of 0, and the straight shape indicates that it is close to a straight line shape, including process errors, positional deviations, and measurement errors that occur during the manufacturing process.

The first connection pattern 331 may have a constant line width. For example, a line width of one end of the first connection pattern 331 connected to the first coil pattern 311 may be formed substantially the same as a line width of the other end of the first connection pattern 331 connected to the first lead-out portion 411, and a region between one end and the other end of the first connection pattern 331 may also have a constant line width, but the present disclosure is not limited thereto.

In this specification, the line width refers to the width of the pattern, and with reference to the direction of FIG. 3, the line width of the first connection pattern 331 may refer to the size in the first direction T on the L-T cross-section. In addition, the meaning that the line width is constant is not limited to the case of being physically identical, and means that it is substantially the same including process errors, positional deviations, and measurement errors that occur during the manufacturing process.

Based on an optical microscope or Scanning Electron Microscope (SEM) photograph of the L-T cross-section of the coil component 1000 polished to expose the first connection pattern 331, the line width of the first connection pattern 331 may refer to an arithmetic mean value of the lengths of three or more line segments among a plurality of line segments connecting the outermost boundary lines of the first connection pattern 331 in the first direction T, and the plurality of line segments may be equally spaced in the second direction L, but the present disclosure is not limited thereto.

The first connection pattern 331 may be disposed to extend in the second direction (L), and in this case, may be disposed to be spaced apart from the first surface 101 of the body 100 at regular intervals, but the present disclosure is not limited thereto.

In this case, the meaning that the separation interval is constant does not limit to the case in which the separation intervals at respective points are physically the same, and means that it is substantially the same including process errors, positional deviations, and measurement errors that occur during the manufacturing process.

Referring to FIG. 3, the ratio Lc/Lb of the length Lc of the first connection pattern 331 in the second direction L to the length Lb of the body 100 in the second direction may be 0.35 or more and 0.90 or less.

In this case, based on an optical microscope or Scanning Electron Microscope (SEM) photograph of the L-T cross-section of the coil component 1000 polished to expose the first connection pattern 331, the length Lc of the first connection pattern 331 may refer to a length in the second direction L, from a point at which a virtual line extending from the second direction (L) innermost boundary line of the first dummy lead-out portion 431 in the first direction T and the outermost turn of the first coil pattern 311 meet, to a point at which the outermost turn of the first coil pattern 311 contacts the first lead-out portion 411. The length Lc of the first connection pattern 331 may refer to an arithmetic mean value of at least three lengths among the lengths of a plurality of line segments parallel to the second direction L while connecting between virtual boundary lines of one end and the other end of the first connection pattern 331 parallel to the first direction T, and the plurality of line segments may be equally spaced in the first direction T, but the present disclosure is not limited thereto.

In the case of the coil component 1000 according to this embodiment, when comprehensively considering the arrangement area of the external electrodes 510 and 520, the dicing process and prevention of short circuits with adjacent components during mounting, it may be preferable that the sum of the margins between the lead-out portions 411 and 412 and the third surface 103 or the fourth surface 104 of the body 100 is at least 0.10 compared to the length Lb of the body 100. Accordingly, the length Lc of each of the connection patterns 331 and 332 may be preferably formed to be 0.90 or less compared to the length Lb of the body 100, but the present disclosure is not limited thereto.

TABLE 1

| Experimental example | Ratio Lc/Lb of connection pattern length (Lc) to body length (Lb) | Maximum Stress Level (%) |
|---|---|---|
| Ref. | 0 | 100 |
| #1 | 0.12 | 97 |
| #2 | 0.35 | 86 |
| #3 | 0.58 | 91 |
| #4 | 0.70 | 91 |
| #5 | 0.76 | 91 |
| #6 | 0.81 | 88 |
| #7 | 0.87 | 92 |
| #8 | 0.91 | 87 |

On the other hand, Table 1 illustrates the maximum stress measurement data according to the ratio Lc/Lb of the connection pattern length Lc to the body length Lb measured after the coil component 1000 according to the present embodiment is mounted on the PCB substrate. When the outermost turns of the coil patterns 311 and 312 are directly connected to the lead-out portion (the location of the dummy lead-out portion in this embodiment) without regions of the connection patterns 331 and 332, the maximum stress measurement data is provided by measuring the ratio of the stress acting when the maximum stress received by the connection portion is set to 100%.

The sample used for the measurement was 20 coil components having a length of 1.0 mm, a width of 0.6 mm and a thickness of 0.8 mm, and a FR-4 board having a length of 100 mm, a width of 40 mm, and a thickness of 1.6 mm when mounted on a PCB substrate was used. After fixing lead (KSD 6704) containing 2 to 3% of silver with solder, the applied stress was measured.

Referring to Table 1 above, as a result of experiments on the maximum stress level according to the ratio (Lc/Lb) of the lengths Lc of the connection patterns 331 and 332 to the length Lb of the body 100 by the inventors for this embodiment, a stress relaxation effect of 8% or more, the criterion for the effect, was observed in the range where Lc/Lb was 0.35 or more.

Therefore, taking the above into account, when the ratio Lc/Lb of the length Lc of each of the connection patterns 331 and 332 to the length Lb of the body 100 in the second direction L is in the range of 0.35 or more and 0.90 or less, a margin area for preventing a short circuit with adjacent components during the arrangement of the external electrodes 510 and 520, the dicing process and mounting may be secured, and simultaneously, a stress relaxation effect of 8% or more as a standard may be obtained.

Referring to FIGS. 1 and 2, the first and second connection patterns 331 and 332 may be disposed in parallel with each other around the support member 200. For example, on both sides of the support member 200, the first and second connection patterns 331 and 332 may be disposed in positions corresponding to each other around the support member 200.

In addition, the first and second connection patterns 331 and 332 are disposed on both sides of the support member 200, and when viewed in the direction of the central axis of the coil 300, for example, in the third direction W, at least some regions around the support member 200 may be disposed to overlap each other.

Through the above structure, compared to the structure without the connection patterns 331 and 332, since the area in which the coil 300 contacts the magnetic body forming the body 100 in the region between the first and second lead-out portions 411 and 412 increases, the stress in the weak connection portion may be effectively relieved. Additionally, the effect of improving inductance according to an increase in the number of turns may also be obtained.

Referring to FIGS. 2 and 4, the coil component 1000 according to the present embodiment may include the lead-out portions 411 and 412 disposed in the body 100 and connected to both ends of the coil 300, respectively.

The first lead-out portion 411 may be connected to one end of the coil 300, for example, the first connection pattern 331, and may be exposed to the first surface 101 of the body 100 to be connected to the first external electrode 510. In addition, the second lead-out portion 412 may be connected to the other end of the coil 300, for example, the second connection pattern 332, and may be exposed to the first surface 101 of the body 100, to be connected to the second external electrode 520. The first and second lead-out portions 411 and 412 may be disposed to be spaced apart from each other on the first surface 101 of the body 100.

On the other hand, the coil component 1000 according to the present embodiment may include dummy lead-out portions 431 and 432 disposed in the body 100 and not directly connected to the coil 300.

The first dummy lead-out portion 431 may be disposed in a position corresponding to the second lead-out portion 412 to be spaced apart from the first coil pattern 311 on one surface of the support member 200 on which the first coil pattern 311 is disposed, and the second dummy lead-out portion 432 may be disposed in a position corresponding to the first lead-out portion 411 to be spaced apart from the second coil pattern 312 on the other surface of the support member 200 on which the second coil pattern 312 is disposed. The first and second dummy lead-out portions 431 and 432 may be disposed to be spaced apart from each other on the first surface 101 of the body 100. Also, the first and second dummy lead-out portions 431 and 432 may be disposed to be spaced apart from the first and second lead-out portions 411 and 412 on the first surface 101 of the body 100.

Referring to FIGS. 1 to 4, the first lead-out portion 411 and the first dummy lead-out portion 431 are disposed on one surface of the support member 200 to be spaced apart from each other, and the second lead-out portion 412 and the second dummy lead-out portion 432 may be disposed to be spaced apart from each other on the other surface of the support member 200.

In detail, the first lead-out portion 411 and the second dummy lead-out portion 432 may be disposed in positions corresponding to each other around the support member 200 to be connected to the first external electrode 510. Also, the second lead-out portion 412 and the first dummy lead-out portion 431 may be disposed in positions corresponding to each other with respect to the support member 200 to be connected to the second external electrode 520.

Referring to FIGS. 1 to 4, the first lead-out portion 411 is disposed to be more adjacent to the fourth surface 104 among the third surface 103 and the fourth surface 104 of the body 100, and the second lead-out portion 412 may be disposed to be closer to the third surface 103 among the third surface 103 and the fourth surface 104 of the body 100.

In addition, the first dummy lead-out portion 431 is disposed to be more adjacent to the third surface 103 among the third surface 103 and the fourth surface 104 of the body 100, and the second dummy lead-out portion 432 may be disposed to be more adjacent to the fourth surface 104 among the third surface 103 and the fourth surface 104 of the body 100.

In detail, on one surface of the support member 200, the first dummy lead-out portion 431 and the first lead-out portion 411 may be sequentially disposed in the direction in which the outermost turn of the first coil pattern 311 is wound from the inside to the outside, and on the other surface of the support member 200, the second dummy lead-out portion 432 and the second lead-out portion 412 may be sequentially disposed in the direction in which the outermost turn of the second coil pattern 312 is wound from the inside to the outside.

Referring to FIGS. 1 to 3, the first and second dummy lead-out portions 431 and 432 are respectively disposed on one surface and the other surface of the support member 200, and the first dummy lead-out portion 431 is spaced apart from the first coil pattern 311 and is connected to the second external electrode 520, and the second dummy lead-out portion 432 may be disposed to be spaced apart from the second coil pattern 312 to be connected to the first external electrode 510.

The first and second dummy lead-out portions 431 and 432 respectively include a lower surface exposed to the first surface 101 of the body 100, and an upper surface opposing the lower surface, and the upper surfaces of the first and second dummy lead-out portions 431 and 432 may be formed to be inclined toward the coil 300, respectively.

Since the dummy lead-out portions 431 and 432 have the above shape, the coil 300 may be disposed to be more adjacent to the dummy lead-out portions 431 and 432, and accordingly, it may be advantageous to improve the number of turns or secure the area of the core 110.

Referring to FIGS. 1 to 3, at least one of the first and second lead-out portions 411 and 412 and the first and second dummy lead-out portions 431 and 432 may include an anchor part AN protruding toward an adjacent surface among the third surface 103 and the fourth surface 104 of the body 100. The anchor part AN may have a shape that protrudes toward the third surface 103 or the fourth surface 104 in the body 100 and also protrudes toward the second surface 102 of the body 100 at the same time, but the present disclosure is not limited thereto.

When the lead-out portions 411 and 412 or the dummy lead-out portions 431 and 432 include the anchor part AN, since the area in contact with the magnetic body constituting the body 100 increases, the coupling force between the body 100 and the lead-out portions 411 and 412 may be strengthened, and the effect of stress relaxation in this embodiment may also be further increased. In detail, resistance to external force generated in the first direction T of the body 100 may be increased.

On the other hand, since the dummy lead-out portions 431 and 432 may be omitted when considering the electrical connection between the coil 300 and the external electrodes 510 and 520, the case in which the dummy lead-out portions 431 and 432 are omitted will also fall within the scope of the present disclosure. However, as in the present embodiment, in the case of including the dummy lead-out portions 431 and 432 having a shape corresponding to the lead-out portions 411 and 412, the external electrodes 510 and 520 formed on the first surface 101 of the body 100 may be symmetrically formed, and thus, the warpage of the support member 200 or the appearance defect of the coil component 1000 may be reduced.

Referring to FIGS. 1 to 4, the coil component 1000 according to the present embodiment may further include a first connection via 421 passing through the support member 200 to connect the first lead-out portion 411 and the second dummy lead-out portion 432, and/or a second connection via 422 passing through the support member 200 and connecting the second lead-out portion 412 and the first dummy lead-out portion 431.

In the case of including the first and second connection vias 421 and 422 as in the present embodiment, in the electrical connection between the coil 300 and the external electrodes 510 and 520, the dummy lead-out portions 431 and 432 are also energized, and therefore, the effect of reducing $R_{dc}$ may be obtained. Additionally, the mechanical coupling force between the lead-out portions 411 and 412 and the dummy lead-out portions 431 and 432 may also be strengthened, and connection reliability between the coil 300 and the external electrodes 510 and 520 may also be improved.

At least one of the coil patterns 311 and 312, the via 320, the connection patterns 331 and 332, the lead-out portions 411 and 412, the dummy lead-out portions 431 and 432, and the connection vias 421 and 422 may include at least one conductive layer.

For example, when the first coil pattern 311, the via 320, the first connection pattern 331, the first lead-out portion 411, the first dummy lead-out portion 431, and the first connection via 421 are formed by plating on one surface of the support member 200; each of the first coil pattern 311, the via 320, the first connection pattern 331, the first lead-out portion 411, the first dummy lead-out portion 431, and the first connection via 421 may include a seed layer and an electrolytic plating layer. The seed layer may be formed by an electroless plating method or a vapor deposition method such as sputtering. Each of the seed layer and the electroplating layer may have a single-layer structure or a multilayer structure. The electroplating layer of the multilayer structure may be formed in a conformal film structure in which one electroplating layer is covered by the other electroplating layer, and may be formed in a shape in which another electroplating layer is laminated on only one surface of one electroplating layer. The seed layer of each of the first coil pattern 311, the via 320, the first connection pattern 331, the first lead-out portion 411, the first dummy lead-out portion 431, and the first connection via 421 may be integrally formed so that no boundary is formed therebetween, but the present disclosure is not limited thereto. The electrolytic plating layer of each of the first coil pattern 311, the via 320, the first connection pattern 331, the first lead-out portion 411, the first dummy lead-out portion 431, and the first connection via 421 may be integrally formed so that a boundary therebetween may not be formed, but the present disclosure is not limited thereto.

Each of the coil patterns 311 and 312, the vias 320, the connection patterns 331 and 332, the lead-out portions 411 and 412, the dummy lead-out portions 431 and 432, and the connection vias 421 and 422 may include a conductive material such as copper (Cu), aluminum (Al), silver (Ag), tin (Sn), gold (Au), nickel (Ni), lead (Pb), titanium (Ti), chromium (Cr), molybdenum (Mo) or alloys thereof, but the present disclosure is not limited thereto.

The external electrodes 510 and 520 may be disposed to be spaced apart from each other on the first surface 101 of the body 100 to be connected to the lead-out portions 411 and 412 and the dummy lead-out portions 431 and 432.

In detail, the first external electrode 510 may be disposed on the first surface 101 of the body 100 to be connected to the first lead-out portion 411 and the second dummy lead-out portion 432. In addition, the second external electrode 520 is disposed on the first surface 101 of the body 100 to be spaced apart from the first external electrode 510, and may be connected to the second lead-out portion 412 and the first dummy pull-out part 431.

On the other hand, for example, the support member 200 may be disposed between the first lead-out portion 411 and the second dummy lead-out portion 432 or between the second lead-out portion 412 and the first dummy lead-out portion 431 and may be exposed to the first surface 101 of the body 100. In this case, a recess may be formed in a region corresponding to the support member 200 exposed to the first surface 101 of the body 100 among the external electrodes 510 and 520 due to plating deviation, but the present disclosure is not limited thereto.

When the coil component 1000 according to the present embodiment is mounted on a PCB substrate or the like, the external electrodes 510 and 520 electrically connect the coil component 1000 to the PCB substrate or the like. For example, the coil component 1000 according to the present embodiment may be mounted such that the first surface 101 of the body 100 faces the upper surface of the PCB substrate, and the external electrodes 510 and 520 spaced apart from each other on the first surface 101 of the body 100 and the connection part of the PCB substrate may be electrically connected.

The external electrodes 510 and 520 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto.

Each of the external electrodes 510 and 520 may be formed of a plurality of layers. For example, the first external electrode 510 may include a first layer in contact with the first lead-out portion 411 and the second dummy lead-out portion 432, and a second layer disposed on the first layer.

In this case, the first layer may be a conductive resin layer including a conductive powder including at least one of copper (Cu) and silver (Ag) and an insulating resin, or a copper (Cu) plating layer. The second layer may have a double layer structure of a nickel (Ni) plating layer and a tin (Sn) plating layer.

Referring to FIG. 5, the insulating film IF may be disposed between the first and second coil patterns 311 and 312 and the body 100 to cover the first and second coil patterns 311 and 312. The insulating film IF may be formed along surfaces of the support member 200 and the first and second coil patterns 311 and 312. The insulating film IF is for insulating the first and second coil patterns 311 and 312 from the body 100, and may include a known insulating material such as paraline, but the present disclosure is not limited thereto. The insulating film IF may be formed by a method such as vapor deposition, but the present disclosure is not limited thereto, and the insulating film IF may also be formed by laminating an insulating film on both sides of the support member 200.

On the other hand, although not illustrated, in this embodiment, an insulating layer covering the first to sixth surfaces 101, 102, 103, 104, 105, and 106 of the body 100 and exposing the external electrodes 510 and 520 may be further included. The insulating layer, for example, may be formed by coating and curing an insulating material including an insulating resin on the surface of the body 100. In this case, the insulating layer may include at least one of thermoplastic resins such as polystyrene, vinyl acetate, polyester, polyethylene, polypropylene, polyamide, rubber, and acrylic, thermosetting resins such as phenol-based, epoxy-based, urethane-based, melamine-based, and alkyd-based resins, and photosensitive insulating resins.

Second and Third Exemplary Embodiments

Figure 6:
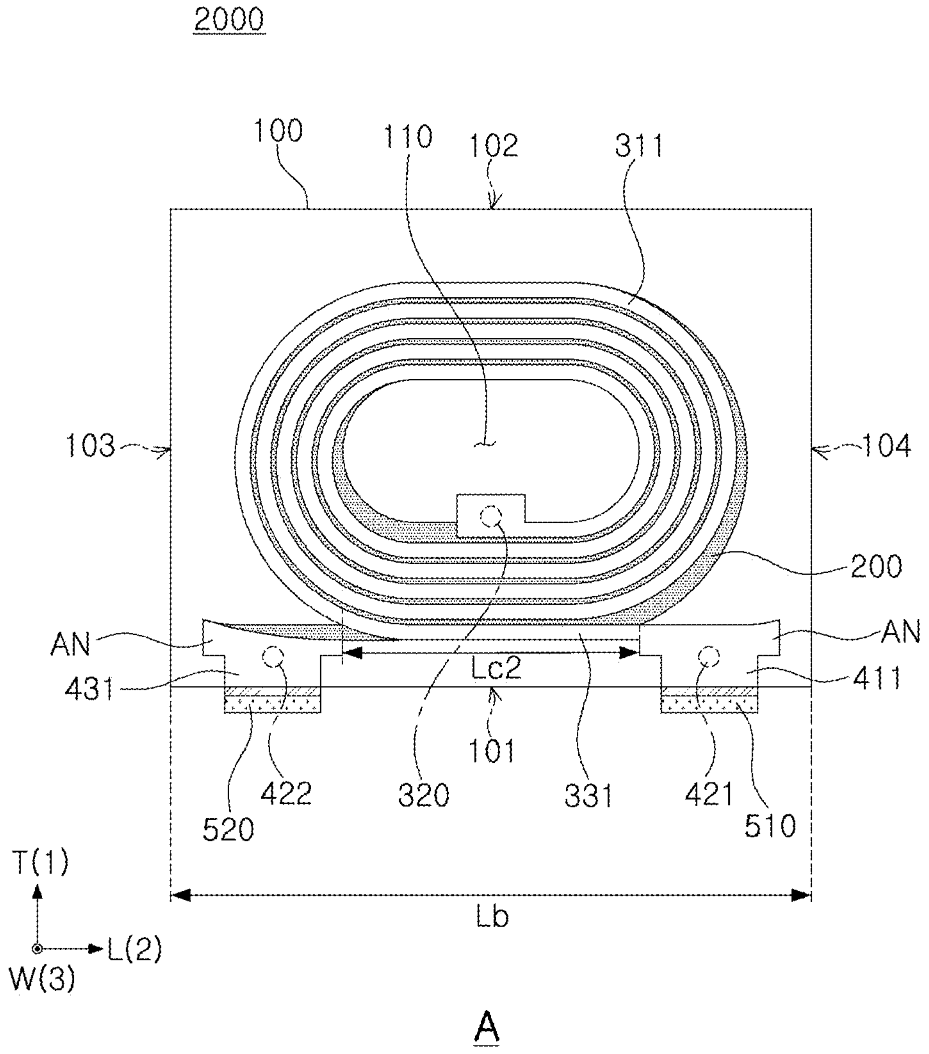
FIG. 6 is a front view of a coil component according to a second exemplary embodiment, and is a view corresponding to FIG. 3.
Figure 7:
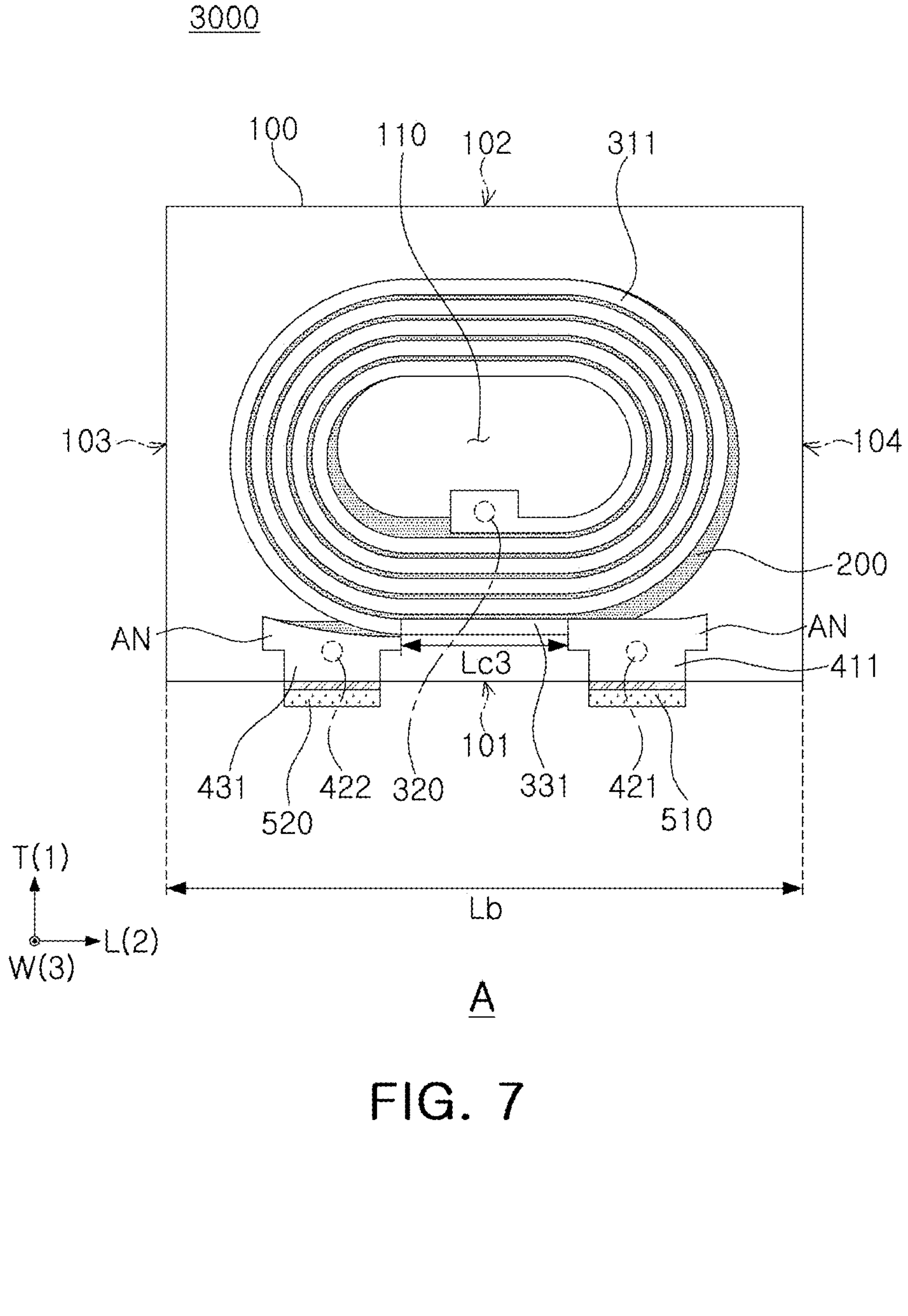
FIG. 7 is a front view of a coil component according to a third exemplary embodiment, and is a view corresponding to FIG. 3.

FIG. 6 is a front view of a coil component 2000 according to a second exemplary embodiment, and is a view corresponding to FIG. 3. FIG. 7 is a front view of a coil component 3000 according to a third exemplary embodiment, and is a view corresponding to FIG. 3.

Referring to FIGS. 6 and 7, in the coil components 2000 and 3000 according to embodiments, the lengths of the connection patterns 331 and 332 are different from those of the first exemplary embodiment. In more detail, in the present embodiments, the ratio Lc/Lb of the length Lc of the connection patterns 331 and 332 to the length Lb of the body 100 is different from the first exemplary embodiment.

Therefore, in describing the present embodiments, only the ratio Lc/Lb of the length Lc of the connection patterns 331 and 332 to the length Lb of the body 100 different from the first exemplary embodiment will be described. For the rest of the configurations of the present embodiments, the description in the first exemplary embodiment may be applied as it is.

Referring to FIG. 6, in the coil component 2000 according to the present embodiment, the length Lc2 of the first connection pattern 331 in the second direction L may be longer than that in the first exemplary embodiment. Accordingly, the ratio (Lc2/Lb) of the length Lc2 of the first connection pattern 331 to the length Lb of the body 100 in the second direction L may be greater than that of the first exemplary embodiment.

However, as in the first exemplary embodiment, when comprehensively considering the arrangement area of the external electrodes 510 and 520, the dicing process, and prevention of short circuit with adjacent components during mounting, since the sum of the margins between the lead-out portions 411 and 412 and the surface of the body 100 should be formed to be at least 0.10 as compared to the length Lb of the body 100, it may be preferable that the length Lc2 of the first connection pattern 331 does not exceed 0.90, compared to the length Lb of the body 100.

FIG. 6 illustrates that the lengths of the first and second connection patterns 311 and 321 are symmetrically, respectively increased, but the present disclosure is not limited thereto. For example, an asymmetric structure in which only the length of one of the first and second connection patterns 311 and 321 is extended is also possible.

When the ratio (Lc2/Lb) of the length (Lc2) of the first connection pattern 331 to the length Lb of the body 100 increases as in the present embodiment, the stress relief effect may be further increased, and as the number of turns of the coil 300 increases, the inductance characteristic may also be improved.

Referring to FIG. 7, in the coil component 3000 according to the embodiment, the length Lc3 of the first connection pattern 331 in the second direction (longitudinal direction) may be shorter than the length in the first exemplary embodiment. Accordingly, the ratio Lc3/Lb of the length Lc3 of the first connection pattern 331 to the length Lb of the body 100 in the second direction (longitudinal direction) may be smaller than that of the first exemplary embodiment.

However, when referring to the experimental data of Table 1 above of the first exemplary embodiment, for a stress relaxation effect of 8% or greater, which is the criterion for a significant stress level relaxation effect, the length Lc3 of the first connection pattern 331 may be preferably 0.35 or more compared to the length Lb of the body 100.

FIG. 7 illustrates that the lengths of the first and second connection patterns 311 and 321 are symmetrically, respectively reduced, but the present disclosure is not limited thereto. An asymmetric structure in which only one of the first and second connection patterns 311 and 321 is formed short is possible.

When the ratio (Lc3/Lb) of the length (Lc3) of the first connection pattern 331 to the length Lb of the body 100 decreases as in the present embodiment, since the effective volume in the body 100 is increased, the effect of improving inductance according to the increase of the magnetic material may be obtained. Further, when the first and second connection patterns 331 and 332 disposed on both surfaces of the support member 200 are viewed in the third direction W, the area of the overlapping region is not much different from the first exemplary embodiment or the second exemplary embodiment, and therefore, stress relaxation effect may be maintained.

Fourth Exemplary Embodiment

Figure 8:
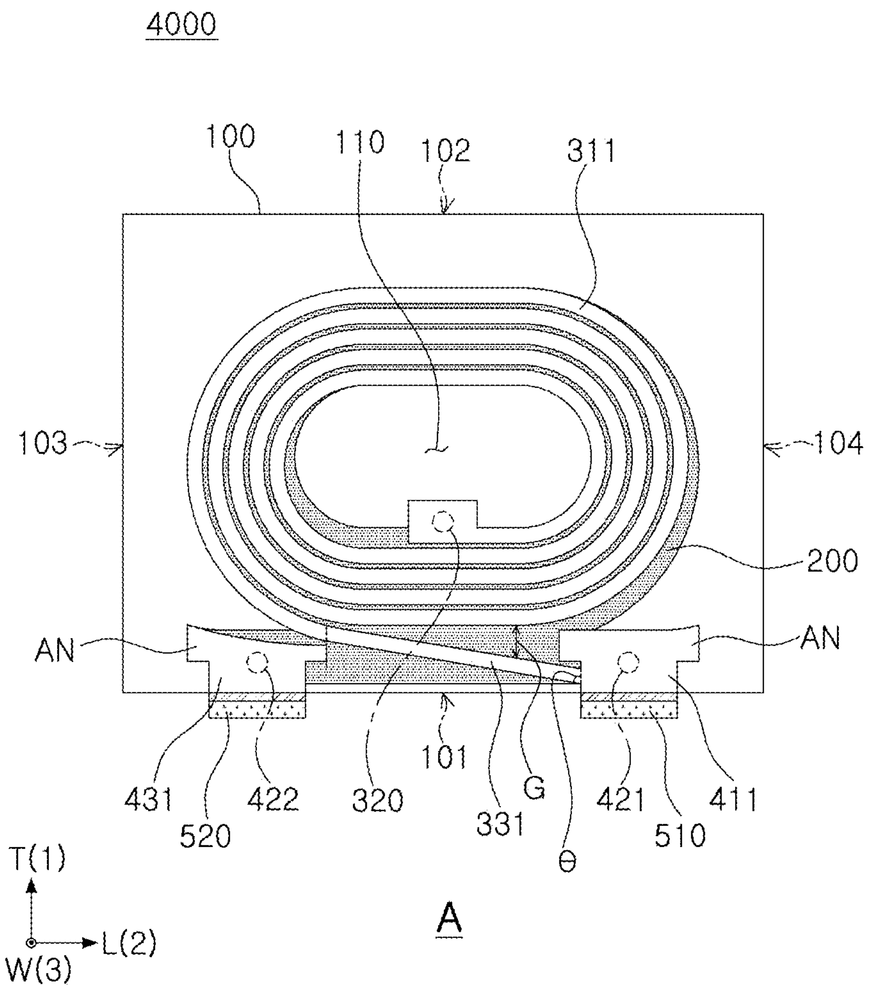
FIG. 8 is a front view of a coil component according to a fourth exemplary embodiment, and is a view corresponding to FIG. 3.

FIG. 8 is a front view of a coil component 4000 according to a fourth exemplary embodiment, and is a view corresponding to FIG. 3.

Referring to FIG. 8, in the coil component 4000 according to the present embodiment, as compared with the first exemplary embodiment, the connection position and the connection angle where the end portions of the connection patterns 331 and 332 are respectively connected to the lead-out portions 411 and 412 are different.

Therefore, in the description of the present embodiment, only the connection positions and connection angles at which the ends of the connection patterns 331 and 332 different from those of the first exemplary embodiment are connected to the lead-out portions 411 and 412 will be described. For the rest of the configuration of the present embodiment, the description in the first exemplary embodiment may be applied as it is.

On the other hand, since the coil 300 portions disposed on both sides of the support member 200 may be formed in a shape corresponding to each other, with reference to FIG. 8 below, the first coil pattern 311, the first connection pattern 331, and the first lead-out portion 411 disposed on one surface of the support member 200 will be described as a reference.

Referring to FIG. 8, in the case of the coil component 4000 according to the present embodiment, in the region between the coil 300 and the first surface 101 of the body 100, the gap G between the first connection pattern 331 and the closest inner turn may be formed to be wider as it approaches the first lead-out portion 411.

For example, in the case of the gap G between the first connection pattern 331 and the turn most adjacent to the first connection pattern 331 in the first direction T among turns of the first coil pattern 311, the gap G is formed to be wider at the other end of the first connection pattern 331 connected to the first lead-out portion 411 than at one end of the first connection patter 331 connected to the first coil pattern 311, and may be formed wider as it approaches the fourth surface 104 of the body 100.

Referring to FIG. 8, based on a cross-section perpendicular to the central axis of the coil 300, for example, an L-T cross-section, the first connection pattern 331 may be disposed to be obliquely connected to the first lead-out portion 411 at a predetermined angle θ. In this case, the connection angle θ may be formed to be less than 90 degrees, and may be appropriately selected according to the direction and degree to which the stress is to be dispersed.

Through the above structure, the effect of stress relief against external forces in various directions may be increased, and since the lower region between the lead-out portions 411 and 412 and the dummy lead-out portions 431 and 432, which is a space filled with a magnetic material in the first exemplary embodiment, is also utilized, the overall length of the coil 300 may be increased, and therefore, it may be advantageous in terms of freedom in designing inductance.

Fifth and Sixth Exemplary Embodiments

Figure 9:
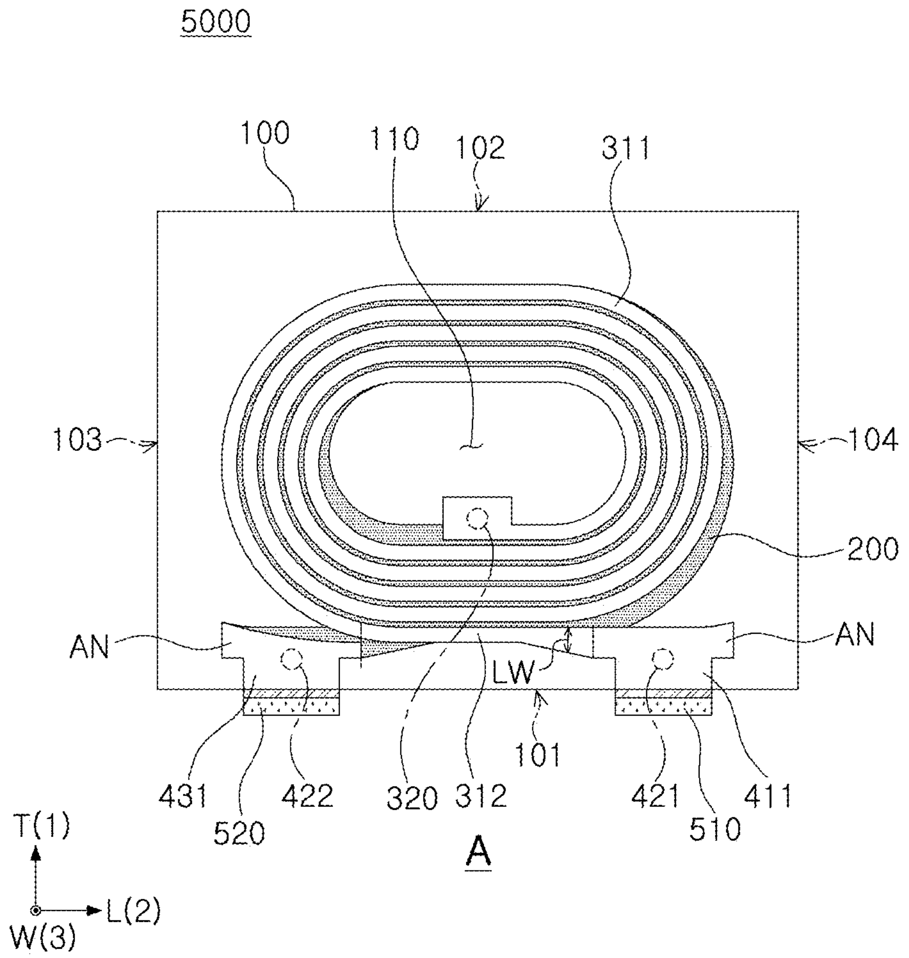
FIG. 9 is a front view of a coil component according to a fifth exemplary embodiment, and is a view corresponding to FIG. 3.
Figure 10:
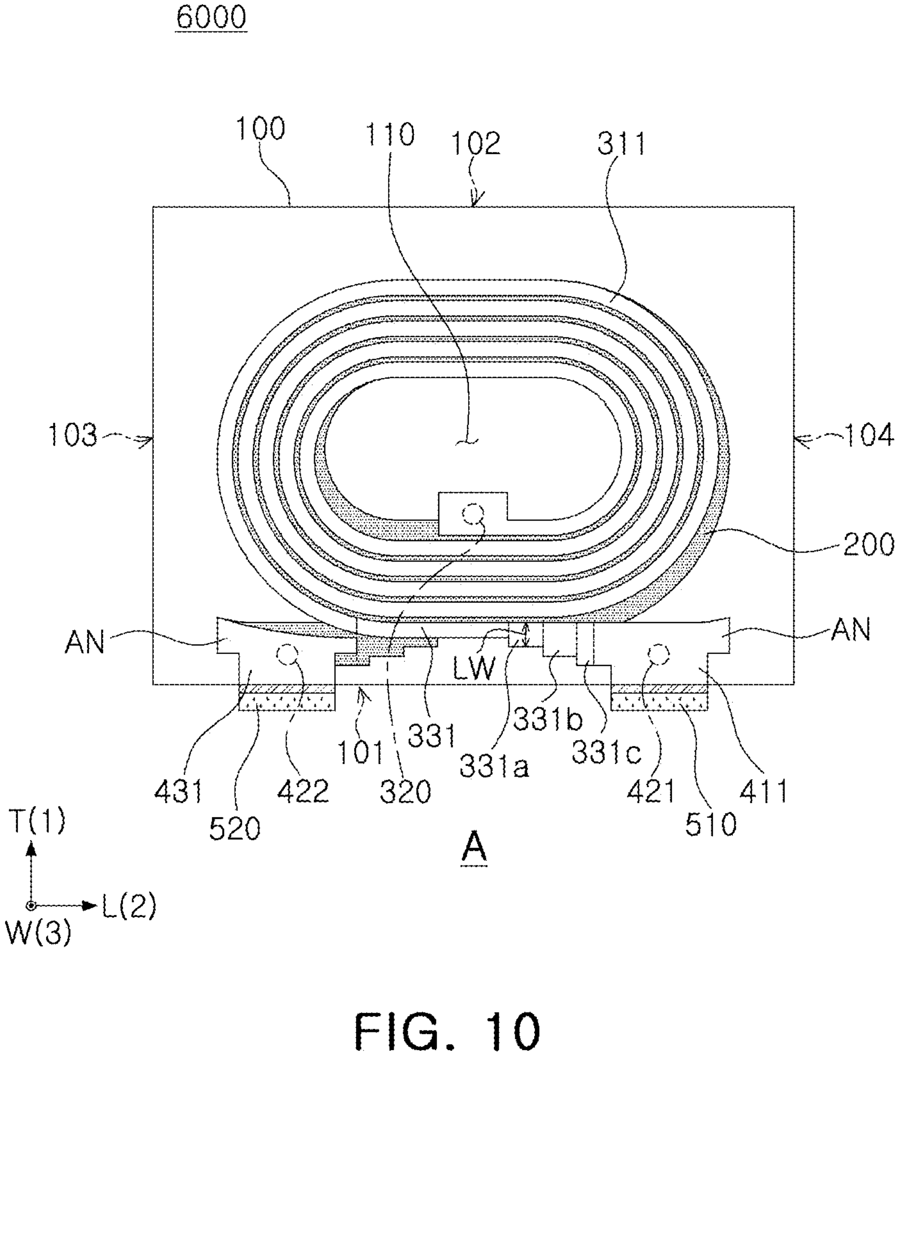
FIG. 10 is a front view of a coil component according to a sixth exemplary embodiment, and is a view corresponding to FIG. 3.

FIG. 9 is a front view of a coil component 5000 according to a fifth exemplary embodiment, and is a view corresponding to FIG. 3. FIG. 10 is a front view of a coil component 6000 according to a sixth exemplary embodiment, and is a view corresponding to FIG. 3.

Referring to FIGS. 9 and 10, in the case of the coil components 5000 and 6000 according to the embodiments, compared with the first exemplary embodiment, the shapes of the connection patterns 321 and 322 are different. In detail, the present embodiments are different from the first exemplary embodiment in that the line widths LW of the connection patterns 321 and 322 are not uniform and become wider toward the area connected to the lead-out portions 411 and 412.

Accordingly, in the description of the present embodiments, only the shapes of the connection patterns 321 and 322 different from those of the first exemplary embodiment and the line width LW according to regions will be described. For the rest of the configurations of the present embodiments, the description in the first exemplary embodiment may be applied as it is.

Referring to FIG. 9, in the coil component 5000 according to the present embodiment, the line width LW of the other end of the first connection pattern 331 in contact with the first lead-out portion 411 may be formed greater than one end thereof adjacent to the first dummy lead-out portion 431.

In addition, the line width LW of the first connection pattern 331 may be formed to be wider adjacent to the first lead-out portion 411, and the line width LW of the first connection pattern 331 between one end and the other end of the first connection pattern 331 may be continuously widened, or may be discontinuously widened.

In the case of the coil component 5000 according to the present embodiment, the first connection pattern 331 has a form maintained in a constant line width LW and continuously increasing from a specific region, but the present disclosure is not limited thereto. For example, an increase in the line width LW may start from one end on which the first connection pattern 331 is connected to the first coil pattern 311.

Referring to FIG. 10, in the coil component 6000 according to the present embodiment, the region in which the first connection pattern 331 and the first lead-out portion 411 are connected may be divided into a plurality of regions 331*a*, 331*b*, and 331*c* having different line widths.

In detail, the region in which the first connection pattern 331 and the first lead-out portion 411 of the coil component 6000 according to the present embodiment are connected may include the first region 331*a*, the second region 331*b* having a greater line width LW than the first region 331*a*, and the third region 331*c* having a greater line width LW than the second region 331*b*. In this case, the third region 331*c* may be disposed to be in contact with the first lead-out portion 411.

In addition, as each of the first to third regions 331*a*, 331*b*, and 331*c* has a constant line width LW, a region in which the first connection pattern 331 and the first lead-out portion 411 are connected may have a stepped shape.

In this case, the line width LW of the first connection pattern 331 refers to the width of the pattern, and based on the directions of FIGS. 9 and 10, the line width LW of the first connection pattern 331 may refer to the size in the first direction (T) on the L-T cross-section.

Based on an optical microscope or Scanning Electron Microscope (SEM) image of the L-T cross-section of the coil component 1000 polished to expose the first connection pattern 331, the line width LW of the first connection pattern 331 may refer to an arithmetic mean value of the lengths of three or more line segments among a plurality of line segments connecting the outermost boundary lines of the first connection pattern 331 in the first direction T, and the plurality of line segments may be equally spaced in the second direction L, but the present disclosure is not limited thereto.

In the present embodiments, as the first connection pattern 331 extends to the first lead-out portion 411, the line width LW increases, and accordingly, since the cross-sectional area of the first connection pattern 331 is increased, $R_{dc}$ may be reduced.

In addition, since the connection area between the first connection pattern 331 and the first lead-out portion 411 is increased, the coupled strength may also be strengthened.

In detail, when the region in which the first connection pattern 331 and the first lead-out portion 411 are connected has a stepped shape as in the sixth exemplary embodiment (6000) of the present disclosure, since the area in which the first connection pattern 331 is in contact with the magnetic body in the body 100 increases, the stress is further relieved by the anchoring effect, and thus, the physical bonding force with the first lead-out portion 411 may be further strengthened.

Seventh Exemplary Embodiment

Figure 11:
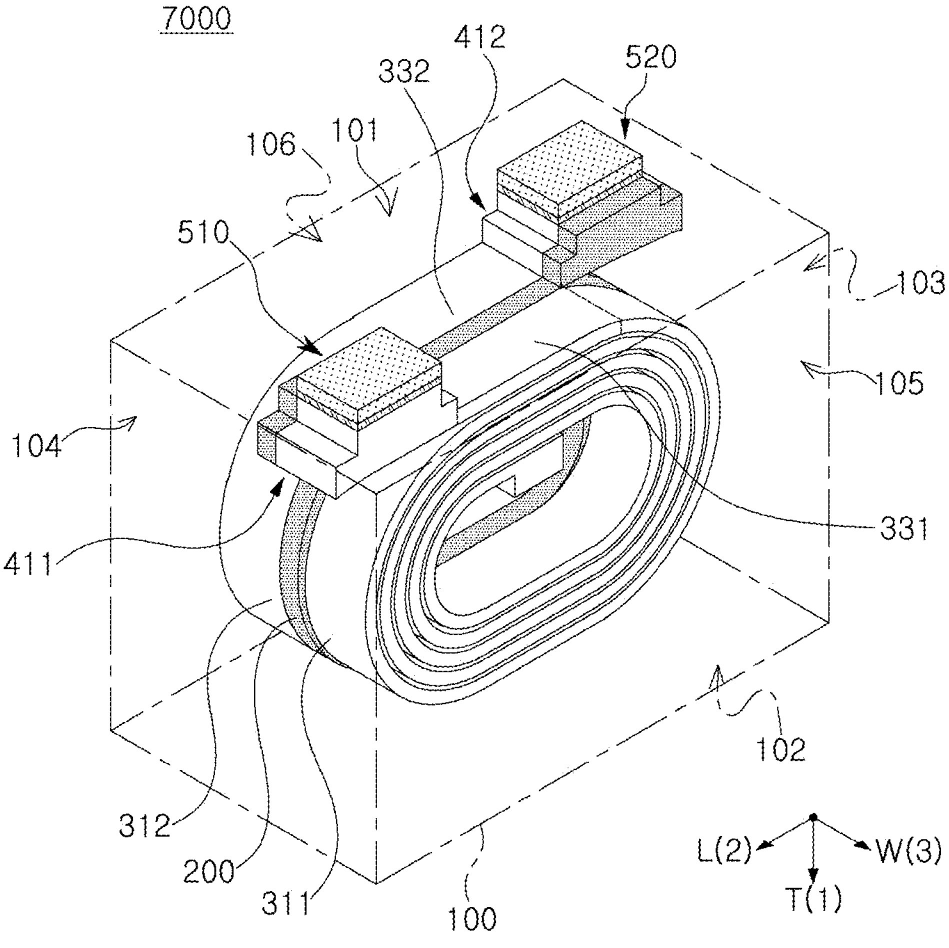
FIG. 11 is a lower perspective view of a coil component according to a seventh exemplary embodiment, and is a view corresponding to FIG. 2.

FIG. 11 is a lower perspective view of a coil component 7000 according to a seventh exemplary embodiment, and is a view corresponding to FIG. 2.

Referring to FIG. 11, in the case of the coil component 7000 according to the embodiment, compared with the first exemplary embodiment, the dummy lead-out portions 431 and 432 and the connection vias 421 and 422 are omitted, and thus the external electrodes 510 and 520 have different shapes.

Therefore, in describing the present embodiments, only the shapes of the external electrodes 510 and 520 and the lead-out portions 411 and 412 different from those of the first exemplary embodiment will be described. For the rest of the configurations of the present embodiments, the description in the first exemplary embodiment may be applied as it is.

Referring to FIG. 11, since the coil component 7000 according to the present embodiment does not have dummy lead-out portions 431 and 432, only the lead-out portions 411 and 412 on the first surface 101 of the body 100 may be connected to the external electrodes 510 and 520. Accordingly, the area occupied by the external electrodes 510 and 520 in the coil component 7000 is reduced, and a recess as a concave region between the lead-out portions 411 and 412 and the dummy lead-out portions 431 and 432 is not formed in the external electrodes 510 and 520.

On the other hand, the first and second lead-out portions 411 and 412 are respectively connected to the outermost turn of the coil 300, and may be disposed to be spaced apart from the inner turn closest to the outermost turn. In addition, in the case of the outermost turn of the coil 300 connected to the first lead-out portion 411 and the outermost turn of the coil 300 connected to the second lead-out portion 412, when viewed in the central axis direction (third direction) of the coil 300, at least some regions around the support member 200 may be disposed to overlap each other.

In the coil component 7000 according to the present embodiment, since the magnetic material may be further filled in the space secured by omitting the dummy lead-out portions 431 and 432, an effective volume may be increased and inductance characteristics may be improved. In addition, by extending the coil patterns 311 and 312 to the space secured by omitting the dummy lead-out portions 431 and 432, the length of the entire turn may be increased, and the degree of freedom in designing the inductance capacity may be increased.

The coil component 7000 according to the seventh exemplary embodiment may be modified according to one or more of the second to sixth exemplary embodiments. That is, the differences between the first exemplary embodiment and one or more of the second to sixth exemplary embodiments may be applied to modify the seventh exemplary embodiment. Or alternatively, the second to sixth exemplary embodiments may be modified based on the seventh exemplary embodiment by omitting the dummy lead-out portions 431 and 432 and the connection vias 421 and 422 and by changing the shapes of the external electrodes 510 and 520. To avoid redundancy, overlapped descriptions are omitted.

As set forth above, according to an embodiment, the coupling force between the coil and the external electrode may be strengthened through stress distribution, and therefore, a coil component having relatively high connection reliability may be provided.

According to an embodiment, a coil component having improved inductance characteristics by increasing the number of turns of the coil pattern may be provided.

While embodiments have been illustrated and described above, it will be apparent to those skilled in the art that modifications and variations could be made without departing from the scope of the present disclosure as defined by the appended claims.

What is claimed is:

1. A coil component comprising:

a body including a first surface and a second surface opposing each other in a first direction, a third surface and a fourth surface opposing each other in a second direction, and a fifth surface and a sixth surface opposing each other in a third direction;

a coil disposed in the body and including a coil pattern having a plurality of turns;

a first lead-out portion disposed in the body and connected to one end of the coil, the first lead-out portion extending to the first surface and being spaced apart from the third to sixth surfaces;

a second lead-out portion disposed in the body and connected to the other end of the coil, the second lead-out portion extending to the first surface and being spaced apart from the third to sixth surfaces;

a first dummy lead-out portion and a second dummy lead-out portion disposed in the body and spaced apart from the coil;

a first external electrode disposed on the first surface of the body and connected to the first lead-out portion; and a second external electrode disposed on the first surface of the body and connected to the second lead-out portion, wherein a coil pattern closest to the first surface among the coil pattern disposed in a region between the first lead-out portion and the first dummy lead-out portion directly extends to the first lead-out portion, and a coil pattern closest to the first surface among the coil pattern disposed in a region between the second lead-out portion and the second dummy lead-out portion directly extends to the second lead-out portion.

2. The coil component of claim 1, wherein a central axis of the coil is parallel to the first surface of the body.

3. The coil component of claim 1, wherein the first lead-out portion and the second dummy lead-out portion are respectively exposed to the first surface of the body and connected to the first external electrode, and the second lead-out portion and the first dummy lead-out portion are respectively exposed to the first surface of the body and connected to the second external electrode.

4. The coil component of claim 1, wherein each of the first and second dummy lead-out portions includes a lower surface exposed to the first surface of the body, and an upper surface opposing the lower surface, and upper surfaces of the first and second dummy lead-out portions are respectively inclined to face the coil.

5. The coil component of claim 1, further comprising a support member on which the coil is disposed.

6. The coil component of claim 5, wherein the support member is disposed perpendicularly to the first surface of the body.

7. The coil component of claim 6, wherein the coil includes first and second coil patterns respectively disposed on one surface and the other surface of the support member, and a via connecting the first and second coil patterns.

8. The coil component of claim 5, wherein the coil includes first and second coil patterns respectively disposed on one surface and the other surface of the support member, and a via connecting the first and second coil patterns.

9. The coil component of claim 8, wherein the via passes through the support member to connect ends of respective innermost turns of the first and second coil patterns.

10. The coil component of claim 8, wherein on the one surface of the support member, the first dummy lead-out portion and the first lead-out portion are sequentially disposed in a direction in which an outermost turn of the first coil pattern is wound from the inside to the outside, and on the other surface of the support member, the second dummy lead-out portion and the second lead-out portion are sequentially disposed in a direction in which an outermost turn of the second coil pattern is wound from the inside to the outside.

11. The coil component of claim 5, wherein the first lead-out portion and the second dummy lead-out portion are spaced apart from each other about the support member, and the second lead-out portion and the first dummy lead-out portion are spaced apart from each other about the support member.

12. The coil component of claim 5, wherein the first lead-out portion and the second dummy lead-out portion are connected to each other through a first connection via passing through the support member.

13. The coil component of claim 12, wherein the second lead-out portion and the first dummy lead-out portion are connected to each other through a second connection via passing through the support member.

14. The coil component of claim 1, wherein an outermost turn of the coil includes a first connection pattern corresponding to the region between the first lead-out portion and the first dummy lead-out portion.

15. The coil component of claim 14, wherein a ratio Lc/Lb of a length Lc of the first connection pattern in the second direction to a length Lb of the body in the second direction is 0.35 or more and 0.90 or less.

16. The coil component of claim 14, wherein in a region between the coil and the first surface of the body, a gap between the first connection pattern and an inner turn closest to the first connection pattern is wider towards the first lead-out portion.

17. The coil component of claim 16, wherein based on a cross section, perpendicular to a central axis of the coil, the first connection pattern is obliquely connected to the first lead-out portion at a predetermined angle.

18. The coil component of claim 14, wherein a line width of the other end of the first connection pattern in contact with the first lead-out portion is greater than a line width of one end adjacent to the first dummy lead-out portion.

19. The coil component of claim 14, wherein a region in which the first connection pattern and the first lead-out portion are connected is divided into a plurality of regions having different line widths.

20. The coil component of claim 19, wherein the region in which the first connection pattern and the first lead-out portion are connected includes a first region, a second region having a line width greater than a line width of the first region, and a third region having a line width greater than a line width of the second region.

21. The coil component of claim 20, wherein the third region is in contact with the first lead-out portion.

22. The coil component of claim 14, wherein the outermost turn of the coil further includes a second connection pattern corresponding to a region between the second lead-out portion and the second dummy lead-out portion, and the first and second connection patterns are disposed on both surfaces of a support member, and at least partially overlap each other around the support member when viewed in a projection in a direction of a central axis of the coil.

23. The coil component of claim 1, wherein at least one of the first and second lead-out portions and the first and second dummy lead-out portions includes an anchor part protruding toward one of the third surface and the fourth surface of the body.

24. The coil component of claim 23, wherein the anchor part protrudes toward the second surface of the body.

25. The coil component of claim 1, wherein, a direction, perpendicular to the first direction, is defined as a second direction, and a direction, respectively perpendicular to the first and second directions, is defined as a third direction, and a maximum length of the coil component in the second direction is 1.1 mm or less, and a maximum width of the coil component in the third direction is 0.66 mm or less.

26. The coil component of claim 25, wherein a maximum thickness of the coil component in the first direction is 0.88 mm or less.

27. A coil component comprising:

a body including a first surface and a second surface opposing each other, a third surface and a fourth surface opposing each other in a second direction, and a fifth surface and a sixth surface opposing each other in a third direction;

a support member disposed in the body, perpendicular to the first surface of the body;

a coil disposed on the support member and including a coil pattern having a plurality of turns;

first and second lead-out portions disposed in the body and respectively connected to one end and the other end of the coil, each of the first and second lead-out portions extending to the first surface and being spaced apart from the third to sixth surfaces; and first and second external electrodes disposed on the first surface of the body and connected to the first and second lead-out portions, respectively, wherein the first and second lead-out portions are respectively connected to an outermost turn of the coil and spaced apart from an inner turn closest to the outermost turn, and in a region adjacent to the first surface of the body, an outermost turn of the coil directly extending to the first lead-out portion and an outermost turn of the coil directly extending to the second lead-out portion partially overlap each other around the support member when viewed in a direction of a central axis of the coil.

28. A coil component comprising:

a body including a first surface and a second surface opposing each other in a first direction, a third surface and a fourth surface opposing each other in a second direction, and a fifth surface and a sixth surface opposing each other in a third direction;

a support member disposed in the body;

a coil including a first coil pattern having a plurality of first turns disposed on one surface of the support member, wherein the plurality of first turns are wound around an axis crossing the fifth surface and the six surface;

a first lead-out portion disposed in the body and connected to the first coil pattern only through a first connection pattern extending from the first lead-out portion, the first lead-out portion extending to the first surface and being spaced apart from the third to sixth surfaces; and a first external electrode disposed on the first surface of the body and connected to the first lead-out portion, wherein the first connection pattern is disposed between the first surface of the body and a core of the coil, and extends across a center plane of the body between the third surface and the fourth surface.

29. The coil component of claim 28, wherein the coil further includes a second coil pattern having a plurality of second turns disposed on another surface of the support member;

the coil component further comprises:

a second lead-out portion disposed in the body and connected to the second coil pattern only through a second connection pattern extending from the second lead-out portion;

a via disposed in the support member to connect the first and second coil patterns; and a second external electrode disposed on the first surface of the body and connected to the second lead-out portion, and the second connection pattern is disposed between the first surface of the body and the core of the coil, and extends across the center portion of the body located in the second direction.

30. The coil component of claim 28, wherein a gap between the first connection pattern and an inner turn of the plurality of first turns closest to the first connection pattern is wider towards the first lead-out portion.

31. The coil component of claim 28, wherein the first connection pattern extends from the first lead-out portion in an oblique direction away from the first surface.

32. The coil component of claim 28, wherein the first connection pattern extends parallel to the first surface.

33. The coil component of claim 28, wherein a line width of an end of the first connection pattern in contact with the first lead-out portion is greater than a line width of another end of the first connection pattern.

34. The coil component of claim 28, wherein the first lead-out portion includes an anchor part protruding toward one of the third surface and the fourth surface of the body.

35. A coil component comprising:

a body including a first surface and a second surface opposing each other in a first direction, a third surface and a fourth surface opposing each other in a second direction, and a fifth surface and a sixth surface opposing each other in a third direction;

a coil disposed in the body and including a first coil pattern having a plurality of first turns wound outwards in a first rotating order in a sequence corresponding to an order of the fourth, second, third, and first surfaces;

a first lead-out portion extending from the first surface towards an interior of the body and connected to the first coil pattern only through a first connection pattern extending according to the first rotating order towards the first lead-out portion, the first lead-out portion being spaced apart from the third to sixth surfaces; and a first external electrode disposed on the first surface of the body and connected to the first lead-out portion, wherein the first external electrode is closer to the fourth surface than the third surface.

36. The coil component of claim 35, wherein the coil further includes a second coil pattern having a plurality of second turns wound outwards in a second rotating order in a sequence corresponding to an order of the fourth, first, third, and second surfaces;

the coil component further comprises:

a second lead-out portion disposed in the body and connected to the second coil pattern only through a second connection pattern extending from the second lead-out portion;

a via disposed in a support member to connect the first and second coil patterns; and a second external electrode disposed on the first surface of the body and connected to the second lead-out portion, and the second external electrode is closer to the third surface than the fourth surface.

37. The coil component of claim 35, wherein a gap between the first connection pattern and an inner turn of the plurality of first turns closest to the first connection pattern is wider towards the first lead-out portion.

38. The coil component of claim 35, wherein the first connection pattern extends towards the first lead-out portion in an oblique direction towards the first surface.

39. The coil component of claim 35, wherein the first connection pattern extends parallel to the first surface.

40. The coil component of claim 35, wherein a line width of an end of the first connection pattern in contact with the first lead-out portion is greater than a line width of another end of the first connection pattern.

41. The coil component of claim 35, wherein the first lead-out portion includes an anchor part protruding toward one of the third surface and the fourth surface of the body.

* * * * *